United States Patent [19]
Kress et al.

[11] Patent Number: 5,494,383
[45] Date of Patent: Feb. 27, 1996

[54] REAMER TIP

[75] Inventors: Dieter Kress, Aalen; Friedrich Häberle, Lauchheim, both of Germany

[73] Assignee: Mapal Fabrik für Prazisionswerkzeuge Dr. Kress KG, Aalen, Germany

[21] Appl. No.: 393,298

[22] Filed: Feb. 23, 1995

[30] Foreign Application Priority Data

Feb. 23, 1994 [DE] Germany .......................... 44 05 750.4

[51] Int. Cl.⁶ ..................................................... B23B 51/00
[52] U.S. Cl. .......................... 408/231; 408/161; 408/713; 407/114; 407/116
[58] Field of Search ........................... 408/199, 231–233, 408/713, 153, 161, 162, 168; 407/40, 47, 107, 113–116

[56] References Cited

U.S. PATENT DOCUMENTS

| | | | |
|---|---|---|---|
| 4,125,342 | 11/1978 | Kress | 408/233 |
| 4,850,757 | 7/1989 | Stashko | 408/199 |
| 5,149,233 | 9/1992 | Kress et al. | 408/199 |

*Primary Examiner*—Steven C. Bishop
*Attorney, Agent, or Firm*—Anderson Kill Olick & Oshinsky

[57] ABSTRACT

A reamer tip having a face and a V-shaped indentation formed in the face and having sides, which form with an imaginary plane extending parallel to the face an angle of about 9°–12°, preferably about 10°.

15 Claims, 4 Drawing Sheets

REAMER TIP

BACKGROUND OF THE INVENTION

The present invention relates to a reamer tip having a face and a substantially V-shaped indentation, which is formed in the face and in which a clamp for securing the tip to a reamer is engageable.

Reamers, as known, are used for precise machining of bore surfaces. A reamer has at least one cutting tip and two guides which support the reamer in the bore. Such a reamer is disclosed in German Patent No. 2,614,599.

It is well known that during machining of bores, during the first insertion of a reamer in a bore, a tip displacement takes place. Therefore, an adjustment of the outer diameter of the reamer, in particular with very narrow measuring tolerances, is required.

Accordingly, an object of the invention is providing a reamer, actually a reamer tip, which would permit to eliminate the need in the adjustment of the reamer outer diameter.

SUMMARY OF THE INVENTION

The above-mentioned and other objects of the invention, which will become apparent hereinafter, are achieved by providing in the face of the reamer a V-shaped indentation the sides of which form with an imaginary plane, extending parallel to the face, and angle of about 9°–12°, preferably about 10°. Providing such an indentation permits to obtain very large clamping forces which hold the tip in the reamer. Because of this, forces, which act on the tip during the first insertion of the reamer into the bore, practically cause no displacement of the tip from its initial position. Therefore, the established operational diameter of the reamer does not change with subsequent insertions of the reamer.

Advantageously, the tip has, on the face thereof, first support surfaces which extend along the side edges of the indentation. The first support surfaces serve for optimally retaining the tip in the tip-receiving groove of the reamer. This insures a particularly high quality of the bore surface and machining with rather small tolerances.

Further, advantageously, the length of the indentation is selected to be smaller than the length of the tip, so that an end side of the indentation forms another support surface. The additional support surface or surfaces likewise insure an optimal retention of the tip in the tip groove.

It is further advantageously contemplated to limit the indentation, in regions opposite to support surfaces provided at the end sides of the indentation, with fillets extending perpendicular to the face of the tip. The tip retaining clamp can thereby be sunk into the tip face, so that cut off chips would not penetrate under the clamp and would not be retained there. If the chips penetrate and are retained under the clamp, they can scratch the bore surface and lead to a deviation of the machined dimensions from predetermined dimensions when the chips are retained between the guides and the bore wall.

Advantageously, the length of the indentation is so selected that only very small side clearances are provided on opposite longitudinal ends of the clamp when the clamp engages the tip face. Providing small side clearances insures, on one hand, an easy engagement of the clamp in the indentation and, on the other hand, prevents the penetration of the chips under the clamp.

It is further advantageously contemplated to limit the sides of the indentation with steps extending parallel to their longitudinal side edges. This also insures that the clamp is sunk into the tip face and prevents penetration of dirt and chip particles under the clamp.

Advantageously, the tip is produced by a sinter or erosion process.

BRIEF DESCRIPTION OF THE DRAWINGS

The features and objects of the present invention will become more apparent, and the invention itself will be best understood from the following detailed description of the preferred embodiment when read with reference to the accompanying drawings, wherein.

DETAILED DESCRIPTION OF THE PREFERRED EMBODIMENTS

Figure 1:
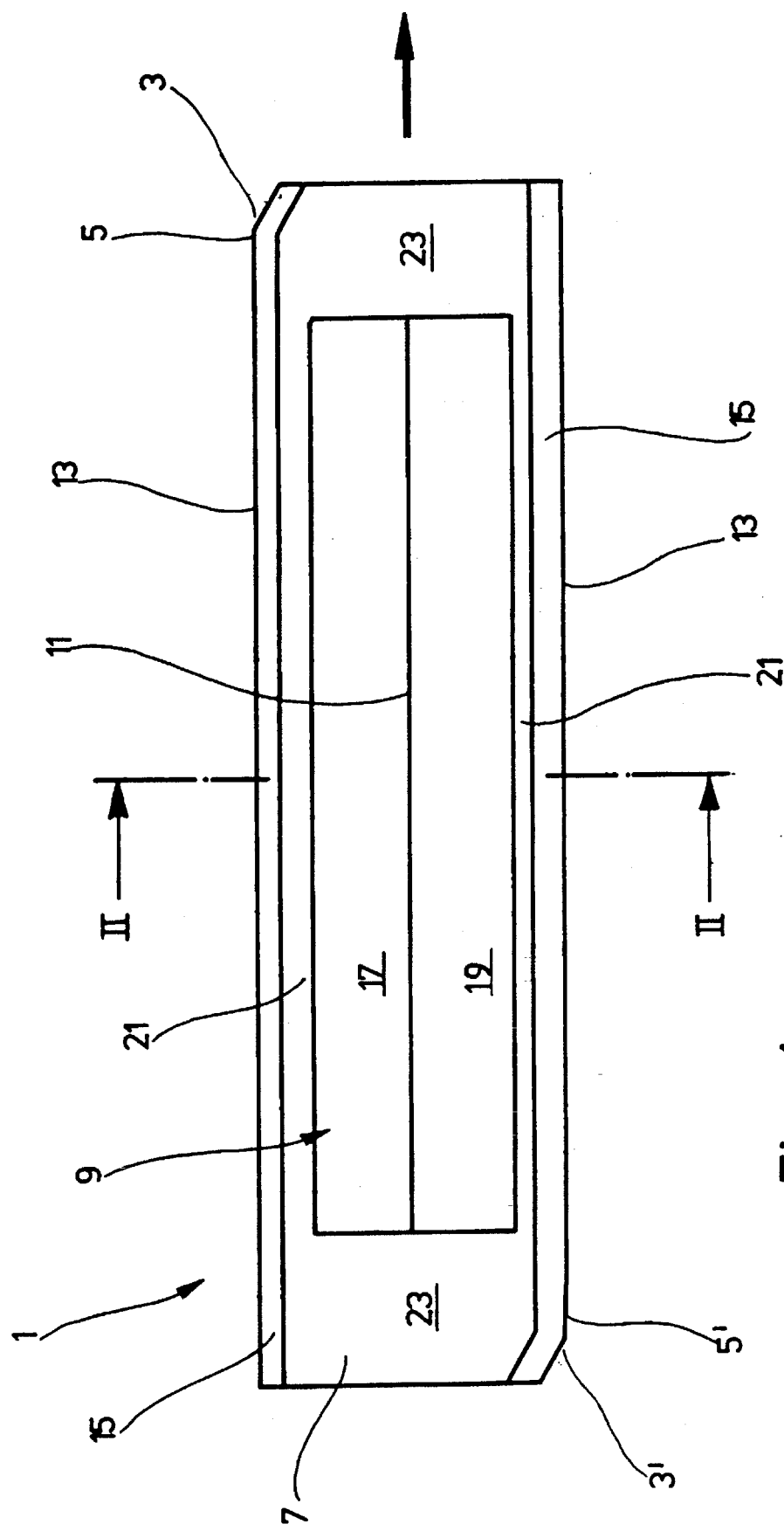
FIG. 1 is a top view of the face of a reamer tip according to the present invention.

FIG. 1 shows a reamer tip according to the present invention. The tip 1 has a substantially rectangular shape and is provided with a chamfer at its righthand corner. The chamfer edge serves as an active main cutting edge 3 for shaving metal from a bore wall during machining of the bore. The main cutting edge 3 is adjoined by an auxiliary cutting edge 5 which tapers in a direction opposite to the displacement direction indicated with an arrow. The taper is so small that it is not visible in the schematic view shown in FIG. 1.

The reamer tip 1 shown in FIG. 1 is a so-called reversible tip. This means that another main cutting edge 3' is located opposite to the first main cutting edge 3. The second cutting edge 3' is likewise adjoined by a second auxiliary cutting edge 5'. With the wear of the first main cutting edge 3, the tip can be turned by 180°, and cutting can be effected with the second cutting edge 3'.

An indentation 9 is formed in the face of the tip 1. The indentation 9 is essentially V-shaped and has a symmetrical profile, so that its center line 11 extends parallel to side edges 13 of the tip 1 at a substantially the same distance therefrom.

Chip guide surfaces 15 extend substantially parallel to the side edges 13. The surfaces 15 serve for guiding away and breaking the chips which are cut off during machining of a bore.

As shown in FIG. 1, the sides 17 and 19 of the indentation 9 are spaced from the side edges 13 and end at a short distance from the guide surfaces 15. The longitudinal edges 21 of the indentation 9 form first support surfaces 21 which are formed as flat strips.

The length of the indentation 9 is smaller than the length of the tip 1 so that on at least one end side of the indentation 9, in the described embodiment, on both sides, second support surfaces 23 are formed. In the embodiment shown in FIG. 1, the indentation 9 is provided somewhat in the middle of the face of the tip 1, so that the first and second support surfaces 21 and 23 are arranged symmetrically relative to each other, respectively. The width of the second support surfaces 23 is so selected that they extend, respectively, at least over the region of the first main cutting edge 3 or the second main cutting edge 3'. Advantageously, the width of second support surfaces 23 is such that they extend, respectively, at least over the region of the first auxiliary cutting edge 5 or the second auxiliary cutting edge 5'. This insures an optimal removal of chips during machining of a bore wall, i.e., the chips are displaced along the face 7 of the tip 1 without any hindrance.

FIG. 1 shows, as it has already been discussed above, a rectangular reamer tip 1, with the indentation 9 in the tip face.

However, it is also possible to make the tip square and to form the indentation likewise square. It is further possible to form a polygon tip and provide an indentation along each side edge.

Figure 2:
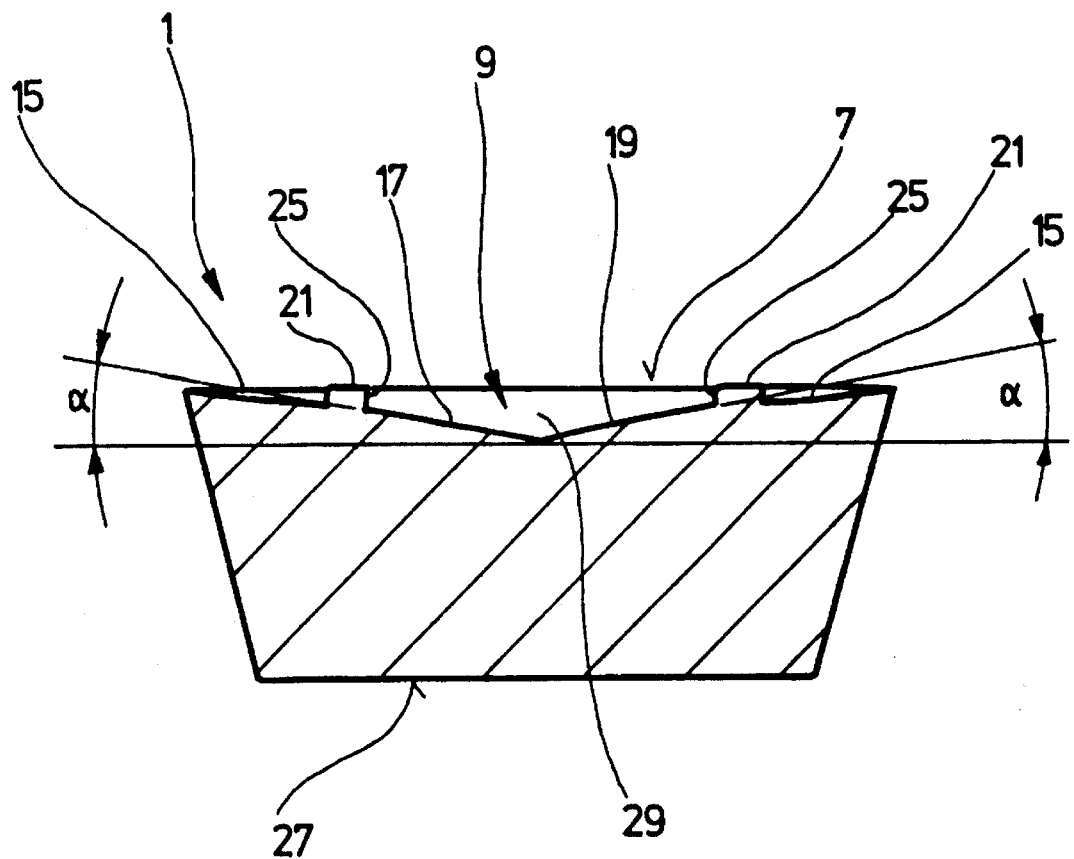
FIG. 2 is a cross-sectional view along line II—II in FIG. 1.

The shape of the indentation 9 is clearly recognizable in the cross-sectional view shown in FIG. 2. In FIG. 2, the elements corresponding to those of FIG. 1 are designated with the same reference numerals.

As it is clearly seen in FIG. 2, the indentation 9 has a V-shaped profile, with the sides 17 and 19 forming steps 25, respectively. The indentation 9 extends into the body of the tip 1. The support surfaces 21 between the indentation 9 and the chip guide surfaces 15, defined by the steps 25, are clearly visible.

The width of the face 7 of the tip 1 is somewhat larger than the base 27. Generally, the cross-section of the tip 1 is substantially trapezoidal.

FIG. 2 shows, finally, that the indentation 9 has, at end surface thereof, a fillet 29 that tapers in a direction perpendicular to the face 7 of the tip 1.

FIG. 2 shows that sides 17 and 19 form with a horizontal, extending parallel to the face 7, an angle α. Providing such an angle permits to obtain optimal clamping forces, as it would be explained in detail below. It has been found that optimal characteristics are obtained with the angle α being equal about 9°–12°, preferably 10°.

Figure 3:
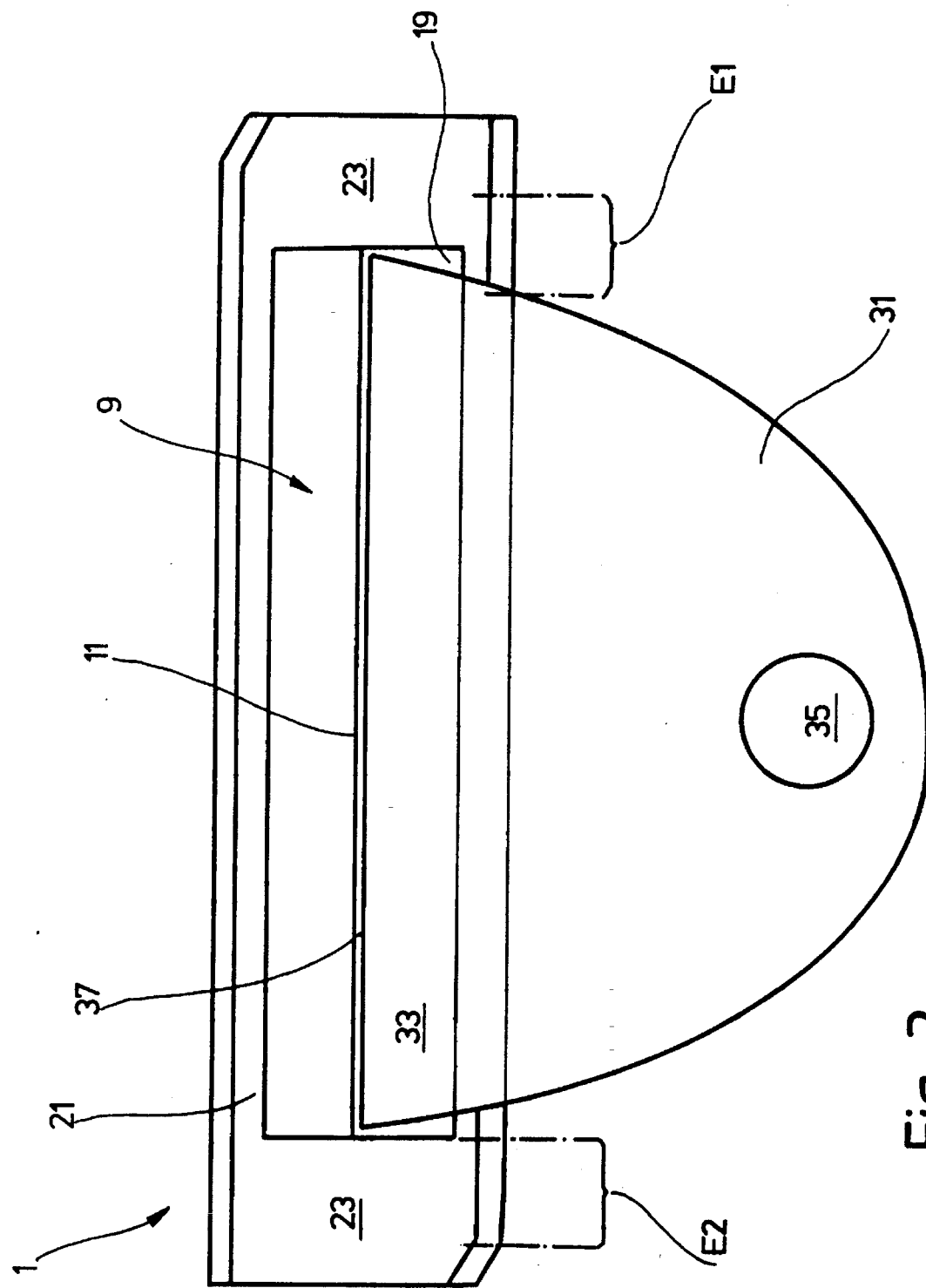
FIG. 3 is another top view of the face of the reamer tip, shown together with the tip holding clamp.

FIG. 3 shows a top view of the face 7 of the tip 1 similar to that of FIG. 1. In addition, FIG. 3 shows a clamp 31 engaging the indentation 9. The clamp 31 can be formed with a clamping lip 33 and a hole 35 through which a clamp bolt for securing the tip 1 to a reamer body extends.

The outmost edge 37 of the clamp 31 or the clamping lip 33 is arranged to extend closely adjacent to the center line 11 of the indentation 9. The side 19 of the indentation 9 has a quasi linear contact with the underside of the clamping lip 33.

When the tip, after the wear of the first main cutting edge 3 or the auxiliary cutting edge 5, is rotated by 180°, the clamping lip 33 engages the side 17 of the indentation 9.

It is possible to provide a reamer, in which the tip is used, with means for adjusting the protrusion of the tip 1 from the reamer circumference and, thereby, for adjusting the tool outer diameter. Such adjusting means are per se known. The known adjusting means comprises, e.g., an adjusting wedge and an adjusting screw. It is contemplated to use two adjusting wedges for acting on the side surface of the tip 10 In FIG. 3, the regions of the tip 1 engageable by the adjusting wedges are designated as E1 and E2.

Advantageously, the adjusting means is so arranged that in the region of the cutting edges, the main and auxiliary cutting edges 3 and 5, the adjusting forces in the side surface of the tip 1 are directed, on one hand, toward the second support surface 23 and, on the other side, toward the region of the tip 1 in which the indentation 9 is provided. The engaging region E1 can be so selected that it extends about 50% over the second support surface 23 and about 50° over the region of the indentation 9. In this way, it is insured that the tip 1 is pressed against the adjusting means in an optimal manner by clamping forces applied to the indentation 9 by the clamp 31. On the other hand, the adjusting means can absorb forces applied to the active main and auxiliary cutting edges 3 and 5.

At the diametrically opposite edge of the tip 1, i.e., in the region of non-active main and auxiliary cutting edges 3' and 5', the adjusting means is so arranged that the adjusting forces are directed toward the engagement region E2. The engagement region E2 is so selected that about 50% of it extends over the region of the indentation 9. In this way, the clamping forces are optimally absorbed and reduce the danger of deflection of the tip 1 under the action of clamping forces to a minimum. It is also possible, with small clamping forces or a thick tip, to located the engagement region E2 in a region of a tip which is located sidewise of the indentation.

Because the width of the second support surface 23 is so selected that it extends above both, the region of the main cutting edge 3 and the region of the auxiliary cutting edge 5, a high stability of the tip 1 is achieved. The forces acting in the body of the tip 1 are absorbed in an optimal manner by adjusting means in the region E1, without causing a deflection of the tip and, thereby, without leading to a change of the predetermined outer diameter of the reamer.

FIG. 3 shows that the width of the clamp 31 or of the clamping lip 33 is so selected that practically no side displacement of the clamp 31 is possible. As a result, the cut off chips cannot penetrate under the clamping lip 33 and be entangled there. The chips, which penetrate under the lip, can break off and entrain the following chips and, thereby, cause scratches in the outer surface of a machined bore. On the other hand, it is possible that the retained chips would be wedged between the bore wall and the reamer guides and would change the predetermined outer diameter of a reamer, which is defined by the active cutting edge and the outer surfaces of the guides.

Figure 4:
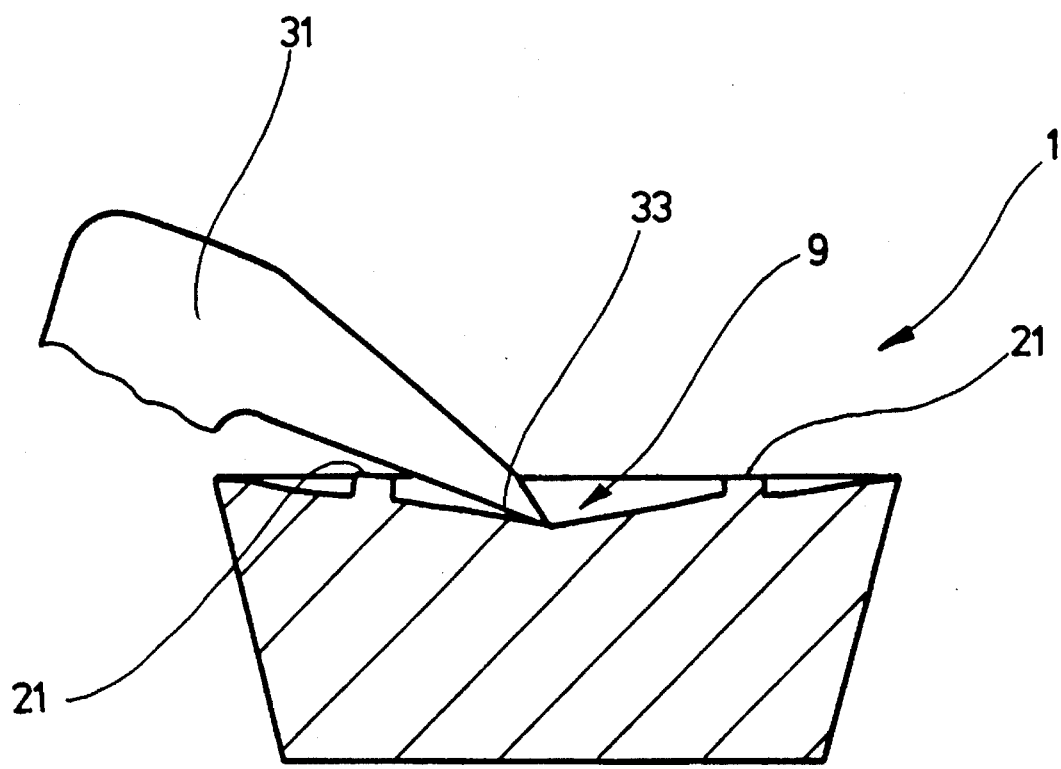
FIG. 4 is a cross-sectional view similar to that of FIG. 2, but showing the position of engagement of the clamp with the tip.

FIG. 4 shows how the clamping lip 33 engages in the indentation 9. FIG. 4 clearly shows that the indentation 9 is sunk in the face 7 of the tip 1, with the steps 25 enabling a sinking arrangement of the clamping lip 33 in the indentation 9. This insures against penetration of the chips and chip pieces under the clamping lip along the entire length of the underside of the clamping lip.

Generally, providing of the indentation 9 insures, on one hand, that the tip 1 is pressed into a groove for receiving the tip, which is formed in a reamer circumference, with large clamping forces. Due to the large clamping forces, the tip is pressed against the groove bottom and the adjusting means, if the latter are used, so that the displacement of the tip in the groove is practically excluded, when the reamer is first time extends into a bore, and no adjustment is needed to compensate for tip displacement.

In addition, the indentation 9 is protected from chip penetration by longitudinally extending steps 25 and the side fillets 29. This insures smooth chip removal and practically completely prevents impairment of finish machining with a reamer by entrained chips.

Providing an indentation in the tip face insures reliable retention of the tip in a reamer, and permits to use such a reamer for high-speed machining of bore surfaces. The first support surfaces 21, which extends along the longitudinal edges of the indentation 9, and the second support surfaces 23 in the region of active cutting edges, the main and auxiliary cutting edges, insure a reliable retention of the tip in the corresponding groove in the reamer body. The second support surfaces 23 insure a reliable contact of the tip with the side surfaces of the tip retaining groove of the reamer. The reliably retained tip is subjected only to relatively small vibrations and that, together with a reliable clamping, prevents any displacement of the tip in the retaining groove. The tips according to the present invention can be produced as with sintering methods so by erosion processes. In both cases, the indentation insures obtaining of the above discussed advantages.

Though the present invention was shown and described with reference to a preferred embodiment, various modifications thereof will be apparent to those skilled in the art and, therefore, it is not intended that the invention be limited to the disclosed embodiment and/or details thereof, and departure may be made therefrom within the spirit and scope of the appended claims.

What is claimed is:

1. A reamer tips comprising:

a face; and a substantially V-shaped indentation formed in the face and having sides that form with an imaginary plane extending parallel to the face, an angle of about 9°–12°;

wherein the face has first support surfaces extending along side edges of the indentation, and wherein the indentation has a length which is smaller than a length of the reamer tip so that at least one end side of the indentation defines a second support surface.

2. A reamer tip as set forth in claim 1, wherein the indentation is formed in a middle of the face so that both end sides of the indentation define two second support surfaces.

3. A reamer tip as set forth in claim 1, wherein the tip has a rectangular shape, wherein regions of longitudinal edges of the tip define main and auxiliary cutting edges, and wherein the second support surface has a width such that the support surface extends at least along the region of a respective main cutting edge.

4. A reamer tip as set forth in claim 3, wherein the second support surface extends over a respective auxiliary cutting edge.

5. A reamer tip as set forth in claim 1, wherein the indentation is limited, opposite the second support surface, with a fillet extending perpendicular to the face.

6. A reamer tip as set forth in claim 1, wherein the tip has, at a side edge thereof located opposite active main and auxiliary cutting edges thereof, a region subjected to action of reamer means for adjusting protrusion of the tip from a reamer circumference, a location of the subjected to the action of the adjusting means region is so selected that adjusting forces are directed at least to a region of the tip in which the indentation is formed.

7. A reamer tip as set forth in claim 6, wherein half of the adjusting forces is directed to the indentation region of the tip, and remaining forces are directed to a region of the tip in which the second support surface is provided.

8. A reamer tip as set forth in claim 7, wherein the tip has another region subjected to the adjusting forces and which at least partially located sidewise of and adjacent to the indentation.

9. A reamer tip, comprising:

a face; and a substantially V-shaped indentation formed in the face and having sides that form, with an imaginary plane extending parallel to the face, an angle of about 9°–12°, wherein the indentation has a length such that only small side clearance exist when the tip is engaged by a reamer clamp which engages into the indentation.

10. A reamer tip, comprising:

a face; and a substantially V-shaped indentation formed in the face and having sides that forms with an imaginary plane extending parallel to the face, an angle of about 9°–12°, wherein the sides of the indentation are limited by steps extending parallel to side edges of the indentation.

11. A reamer tip, comprising:

a face; and a substantially V-shaped indentation formed in the face and having sides that form, with an imaginary plane extending parallel to the face, an angle of about 9°–12°;

wherein the face has chip guide surfaces extending substantially parallel to side edges of the tip, and wherein the face has first support surfaces extending along side edges of the indentation and formed as flat strips defined by steps extending between respective side edges of the indentation and respective side edges of the chip guide surfaces remote from the side edges of the tip.

12. A reamer tip as set forth in claim 11, wherein said angle is about 10°.

13. A reamer tip as set forth in claim 11, wherein the tip has side edges, and the indentation has a center line which extends parallel to the side edges at substantially equal distances therefrom, the center line defining the line of symmetry of the indentation.

14. A reamer tip as set forth in claim 11, wherein the tip comprises a reversible tip and has opposite side edges respective opposite regions of which define respective main and auxiliary cutting edges.

15. A reamer tip as set forth in claim 11, wherein the tip comprises one of sinter-formed and erosion-formed tips.

* * * * *